United States Patent Office 3,544,365
Patented Dec. 1, 1970

3,544,365
CLEANING METHOD
Arline G. McCormick, Vernon, Conn., assignor to Conversion Chemical Corporation, Rockville, Conn., a corporation of Connecticut
No Drawing. Filed Nov. 20, 1968, Ser. No. 777,468
Int. Cl. B08b 3/08, 3/10
U.S. Cl. 134—1                                    13 Claims

ABSTRACT OF THE DISCLOSURE

A method for removing food residues from metallic utensils used at elevated temperatures for food preparation involves applying a cleaning solution to the surface of the utensil and maintaining the solution in contact with the surface under conditions of time and temperature sufficient to separate the residue therefrom. The cleaning solution employed contains a chlorinated organic solvent and an activator therefor. Preferably it includes an oil-soluble surfactant and a layer of water is provided on the top thereof to act as a barrier to vaporization of the solvent.

BACKGROUND OF THE INVENTION

As is well known, pots, pans, baking sheets and similar cooking utensils normally become encrusted with hard, tenacious deposits which remain after the food product has been removed therefrom. This condition becomes more pronounced as the surface of the utensil becomes pitted or scratched so as to provide indentations in which the foodstuff may mechanically engage and thereby increase the adhesion therebetween. Such deposits are undesirable and should be removed before the utensil is used again. Cleaning is a time-consuming operation and represents a particularly serious problem for commercial producers due to the many utensils which are normally involved and the frequency at which they must be cleaned. Moreover, it is important that the cleaning method be safe, both from an operational standpoint and also from the standpoint of avoiding harmful residues or by-products which might remain at the completion of the cleaning procedure.

Quite conventionally, resinous coatings or glazes (for example, of the siloxane polymers) are provided on the surface of such utensils in contact with the food material to facilitate release of the cooked product therefrom. Although the materials now available for such coatings are in many cases sufficiently durable to be used repeatedly, these coatings tend to become scratched or pitted or to wear off, thus introducing the problem of mechanical and chemical adhesion with the foodstuff. Thus, it is also important that any cleaning process permit the food residues to be removed selectively while leaving resins such as the siloxanes substantially intact.

Accordingly, it is an object of the present invention to provide a method for conveniently and efficiently removing the food residues which are produced on metallic utensils used for the preparation thereof at elevated temperatures.

It is also an object to provide a solvent method by which such residue can be removed selectively from utensils having a resinous coating on the surface thereof without substantial detriment to the coating material.

Another objective is to provide such a method which is relatively safe in operation and which results in no harmful residue or by-product remaining on the surface of the utensil at the completion thereof.

SUMMARY OF THE INVENTION

It has now been found that the foregoing and related objects can be readily attained in a method which comprises preparing a cleaning solution comprising about 0.1 to 40.0 percent by weight of an organic acid or amine activator therefor in 99.9 to 60.0 percent of a chlorinated organic solvent. The solution is applied to the surface of metallic utensils having a food residue thereon, is maintained in contact with the surface for a period of time and at a temperature sufficient to separate at least a portion of the residue therefrom.

Preferably, relative motion is created between the solution and the surface having the residue at least a part of the period of contact, and also the method preferably includes a rinsing step utilizing a stream of water directed against the surface. In its most desirable embodiment, water is added to the cleaning solution in an amount sufficient to produce a two-phase system wherein the water provides a separate protective layer on top of the organic phase.

DESCRIPTION OF THE PREFERRED EMBODIMENTS

The cleaning solution

The cleaning solution comprises about 60.0 to 99.0 percent, preferably about 70.0 to 99.5 percent, and most desirable about 85.0 to 96.5 percent by weight of a chlorinated organic solvent. Exemplary of the various solvents which are suitable for use herein are methylene chloride, chloroform, monochlorobenzene and orthodichlorobenzene. Although mixtures of the foregoing solvents may be used with one another and other chlorinated solvents not specified may be substituted or used in combination therewith, preferably methylene chloride is employed as the sole chlorinated organic solvent or at least as the predominant component of a mixture of such solvents. For example, methylene chloride has been found to be very effective in raising the flash points of more flammable solvents which may be employed therewith. In general, the cleaning efficiency of the organic solvents for the present application is an inverse function of chlorine substitution and chain length. As will be readily appreciated, the organic solvent should not leave any toxic residue on the surface of the utensil being cleaned and should be non-flammable or at least have a flash point sufficiently high to minimize the likelihood of explosion. Methylene chloride has desirable properties in both these aspects.

The second essential ingredient of the solutions used in the present method is an organic acid or amine activator for the chlorinated solvent. The activator is employed in an amount of about 0.1 to 40.0 percent, preferably about 0.4 to 7.0 percent, and most desirably about 1.0 to 2.5 percent, based upon the total weight of the solvent solution. It is believed that such activators facilitate penetration of the solvent through the undesired residue, thus enhancing the effectiveness thereof. The most effective activators are the organic acid type, with formic acid being preferred. Exemplary of the acids other than formic which may be used are glacial acetic, trichloroacetic, adapic, benzoic, citric, malic, salicylic, tannic, tartaric, fumaric, gluconic, propionic, butyric, cinnamic and mixtures thereof. Exemplary of the most suitable amines are methylamine, monoethanolamine, cyclohexylamine, propylene diamine and ethylene diamine; operative but less satisfactory amines include isopropanolamine, triethanolamine, diphenylamine, pyridine, and diethanolamine. A disadvantage which may be involved in using the amines is that they tend to react with formaldehyde which may form as methylene chloride hydrolyzes. It will be appreciated that the organic acid or amine should not leave a toxic residue and should be stable in the solution. Of the various activators, formic acid is preferred.

In addition to the foregoing, in the preferred solutions, relatively small amounts of an oil-soluble surfactant are present and the amount thereof is about 0.1 to 5.0, and preferably about 0.5 to 1.5 weight percent, based upon the weight of the entire solution. Exemplary materials are the long-chain polar compounds such as octylphenoxy polyethoxyethanol, the alkali metal salts of alkylaryl polyether sulfates and triethanolamine lauryl sulfate; fluorocarbons such as 9-hydroperfluornonoic acid; silicones such as silicone greases and oils; any various other well known, commercially-available surface-active agents.

Up to 10.0 percent, and preferably about 1.0 to 5.0 percent based upon the weight of the solution, of a polar organic solvent may be used in addition to the chlorinated solvent. Materials such as methanol, ethanol, dimethylsulfoxide, etc., which are known as "cosolvents" for the chlorinated organic solvents, are useful, but it should be pointed out that when included in the preferred amounts these compounds appear to function more as activators than as cosolvents.

Water dissolved in the solution has a beneficial effect upon the cleaing efficiency thereof, and it is therefore desirable to include it therein in an amount up to the limit of solubility. For example, about 1.0 to 6.0 percent of water may be dissolved in methylene chloride at room temperature, but at other temperatures or with different solvents up to about 10.0 percent of water may be of benefit to cleaning effectiveness.

Finally, it should be pointed out that other additives, such as thickeners, vapor pressure depressants, waxes, water-soluble surfactants, etc., may also be included to vary the properties or operation of the cleaning solutions.

The water seal

In many instances, for example when methylene chloride is employed as the chlorinated organic solvent, the solutions have a high vapor pressure and accordingly a strong tendency to evaporate at the temperatures of operation. This often presents a serious problem, and particularly so with a solvent such as methylene chloride which produces noxious vapors and which is desirably used at a temperature approaching its boiling point. Although problems arising from vaporization may be alleviated by including vapor pressure depressant in the solutions, such a practice is frequently undesirable for economical and technical reasons. Therefore, it is most desirable in carrying out the method of this invention to employ water in combination with the organic solvent solution in an amount greater than that which is soluble in the solvent solution, as has been suggested hereinbefore.

More specifically, in accordance with the most desirable method of operation, water is added to the solvent solution in a quantity sufficient to provide a two-phase bath with a layer of water above the solution, ideally at least one-half inch in depth. Cleaning baths of this type are beneficial not only from the standpoint of greatly diminishing the volume of noxious fumes produced, but also because of the beneficial effect of the dissolved water upon cleaning efficiency. Since approximately 6 grams of water are soluble in 100 grams of methylene chloride at room temperature, the aqueous compositions should contain more than about 10.0 weight percent of water to provide the separate aqueous phase which is desired. It should be appreciated that while large amounts of water may better protect against evaporation, it is undesirable to dissolve too much of the activator in the aqueous phase. For this reason, and to avoid unduly large volumes of liquid, the amount of water should be kept relatively small. Therefore, a practical upper limit for the water to provide the bath is about 50 percent and preferably about 30 percent, in all instances the amount of water being based upon the weight of the non-aqueous components of the solvent solution.

The method

As has been indicated, the method of the present invention is carried out by first preparing a solution of the components hereinbefore enumerated and applying it to the surface of the utensils which have the undesired residue thereon. Application of the cleaning formulation may be accomplished by any suitable method such as by spraying, brushing, dipping, etc., but most desirably the article to be cleaned is immersed in a two-phase bath consisting of the solution and a layer of water thereon.

Although the chlorinated organic solution is referred to herein as a "solvent" solution, this term is not intended in the sense that the solution acts wholly as a solvent for the food residue. It is believed that usually the residue is not completely dissolved, but is merely loosened from the surface of the equipment by dissolution of only a portion of it. Accordingly, it is most beneficial to conclude the procedure with a rinsing or flushing step; most desirably the rinsing step is accomplished by directing a stream of hot or warm water against the treated surface to wash away any material which may remain. Thereafter, the equipment is allowed to dry or is force dried to produce a clean surface on which no undersirable residues or by-products are present.

Maximum efficiency is attained when relative motion is created between the utensil to be cleaned and the cleaning solution. Such motion may be created in any suitable manner such as by movement of the article or agitation of the liquid, but when a separate water phase is present it is best to operate in such a manner that the interface is not unduly disturbed. An especially advantageous mode of operation is one in which the relative motion is created by ultrasonic agitation since the effectiveness of cleaning is greatly enhanced thereby with a minimum amount of disruption of the water layer.

The time of contact necessary to achieve the objectives of the invention depends to a large degree upon the temperature at which the solution is used. Operation at any temperature between ambient and slightly below the boiling point of the solution is generally suitable and, under such conditions, the time involved will usually range from about 1 to 15 minutes. If the deposit is particularly tenacious the time of contact may be quite a bit longer than 15 minutes, and, on the other hand, periods shorter than 1 minute may be sufficient for light deposits or when the solution is relatively hot. It will be appreciated that in the optimum case the conditions of operation will be selected so as to achieve a balance between the time necessary for adequate cleaning and the temperatures at which operation is most convenient and safe.

A particularly surprising benefit of the present invention resides in the fact that by the practice thereof utensils provided with resinous release coatings can be thoroughly cleaned without removal of or serious detriment to the coating material. This factor permits the benefits of the release coating to be obtained without the effort and expense involved in repeated applications of fresh resin. Furthermore, since the coating is not dissolved, the life of the cleaning mixture is extended because it does not become contaminated with the coating resin. The most common resin which is applied as a release glaze or coating on cooking utensils are the silicone polymers, or more properly the hardened siloxane resins, but other polymers such as the tetrafluoroethylene resins may also be used in such application. An exemplary glaze material is the silicone resin sold by Dow Corning Corporation under the trade name Pan Glaze.

It should be appreciated that the term "utensil" or "cooking utensil" as used herein includes pots, pans, baking sheets, trays, etc. It also includes laminated products such as combinations of a metal foil and a plastic (insoluble) and utensils having ceramic coatings.

SPECIFIC EXAMPLES

Exemplary of the efficacy of the present invention are the following specific examples wherein all parts and percentages are on a weight basis unless otherwise specified.

EXAMPLE ONE

A series of formulations are prepared using about 180 parts of methylene chloride, about 2.0 parts of triethanolamine lauryl sulfate anionic, oil-soluble surfactant (sold by Onyx Chemical Co. under the trade name Maprofix TLS), and varying amounts of an 85 percent aqueous solution of formic acid. Since formic acid is soluble both in water and also in methylene chloride, only a portion of the total amount added is dissolved in the organic phase; the data tabulated below indicates the parts of 85 percent formic acid added and the approximate weight and percentage of formic acid found in the organic phase:

TABLE ONE.—FORMIC ACID

| Weight of 85% solution added (parts) | Weight in organic phase (parts) | Percent in organic phase |
| --- | --- | --- |
| 1.18 | 0.73 | 0.4 |
| 2.18 | 1.35 | 0.75 |
| 3.18 | 1.97 | 1.08 |
| 5.0 | 3.1 | 1.09 |
| 6.5 | 4.0 | 2.17 |
| 7.0 | 4.33 | 2.35 |
| 8.0 | 4.94 | 2.7 |
| 10.0 | 6.18 | 3.3 |
| 20.0 | 12.4 | 6.45 |

The aqueous and organic phases are separated to the extent practicable, and the organic phase is used at room temperature as a cleaning bath. Bakery pans coated with a commercial siloxane glaze and having a residue on the interior surface thereof from bread baked therein are immersed in each of the several formulations and agitated for a period of about 5 to 15 minutes, until equivalent levels of cleaning appear to be reached. Thereafter, they are removed from the baths and flushed with a stream of hot water under pressure. In each case the residue is completely removed and the siloxane glaze remains intact; upon drying, no by-product, film or other residue is detected. The cleaning rate increases noticeably as the amount of formic acid in the bath increases to about 4.33 parts, i.e., about 2.35 percent; at higher concentrations, no appreciable increase is apparent.

EXAMPLE TWO

The procedure of Example One is repeated utilizing the bath prepared with 7.0 parts of formic acid, but water is added thereto in an amount sufficient to produce an aqueous layer about one-half inch in depth on top of the organic phase when the phases come to equilibrium. A residue-encrusted baking pan is gently agitated for about 5 minutes therein, and thereafter flushed with water and dried. The results achieved are comparable to those of Example One, but considerably less vapors are detected over the bath and the immediate environment is much more pleasant for the operating personnel.

EXAMPLE THREE

The procedure of Example Two is repeated several times, but agitation is effected ultrasonically; the time required in the bath to produce a clean pan is reduced significantly.

ADDITIONAL EXAMPLES

In addition to the foregoing, numerous baths are prepared substituting other chlorinated organic solvents, other activators, other surfactants, and including other additives, specifically about 0.5 percent of an ozokerite wax to retard evaporation and about 2.6 percent of methyl alcohol as a cosolvent or activator.

The chlorinated solvents which produce the best results are chloroform, monochlorobenzene and orthodichlorobenzene. Acid activators which are substituted for formic acid with comparable or at least good results are glacial acetic, trichloroacetic, adipic, benzoic, citric, malic, salicylic, tannic tartaric fumaric and gluconic. Suitable amines for substitution are found to be methylamine monoethanolamine, cyclohexylamine, propylene diamine and ethylene diamine.

The most effective surfactants for use in place of a sulfate derivative specified in the foregoing examples are octylphenoxy polyethoxyethanol, sodium salts of alkyl aryl polyether sulfates (Triton X–100 and Triton X–301, respectively—Rohm & Haas Co.) and fluorochemicals sold by 3M Company under the trademarks FC–95, FC–98, FCD–1874 (9-hydroperfluorononoic acid) and C9–F, a fluoroalcohol.

Thus, it can be seen that the present invention provides a method for conveniently and efficiently removing the residues which are produced on utensils used for the preparation of food at elevated temperatures. The method permits selective removal of such residues from equipment having a resinous siloxane coating on the surface thereof without substantial detriment to the coating material, and it is safe since no toxic residues or by-products result therefrom.

Having thus described the invention, I claim:

1. In a method for removing food residues from metallic utensils used for food preparation at elevated temperatures, the steps comprising:
   (A) applying to the surface of said utensils a cleaning solution comprising 0.1 to 40.0 percent by weight of a cleaning activator selected from the group consisting of formic acid, glacial acetic acid, trichloroacetic acid, adipic acid, benzoic acid, citric acid, malic acid, salicylic acid, tannic acid, tartaric aid, fumaric acid, gluconic acid, propionic acid, butyric acid, cinnamic acid, methylamine, monoethanolamine, cyclohexylamine, propylene diamine, ethylene diamine, and mixtures thereof; and 99.9 to 60.0 percent by weight of a chlorinated organic solvent selected from the class consisting of methylene chloride, chloroform, monochlorobenzene, orthodichlorobenzene, and mixtures thereof; and
   (B) maintaining said cleaning solution in contact with said utensil surface for a period of time and at a temperature from ambient to above.

2. The method of claim 1 wherein said solution additionally contains about 0.1 to 5.0 percent by weight of an oil-soluble surface-active agent.

3. The method of claim 1 wherein water is added to said solution in a quantity sufficient to provide a two-phase mixture with a layer of water on top of said solution, said water layer limiting evaporation of the solvent.

4. The method of claim 1 wherein relative motion is created between said solution and surface during at least a part of the period during which said surface and solution are in contact.

5. The method of claim 4 wherein said relative motion is created by ultrasonic agitation.

6. The method of claim 1 wherein there is included a rinsing step effected subsequent to step C in which a stream of water is directed against said surface.

7. The method of claim 1 wherein said period of contact is about 1 to 15 minutes, and wherein said temperature ranges from about ambient to slightly below the boiling point of said solution.

8. The method of claim 1 wherein up to about 10.0 percent by weight of an alcoholic cosolvent is included in said solution.

9. The method of claim 1 wherein said organic solvent is methylene chloride and said acid activator is formic acid.

10. The method of claim 1 wherein said utensil is a metallic baking pan or similar container with a resinous siloxane glaze, which glaze is substantially intact at the completion of all of said steps.

11. In a method for removing food residues from metallic utensils used for food preparation at elevated temperatures, the steps comprising:
   (A) applying to the surface of said utensils a cleaning solution comprising about 0.4 to 7.0 percent by weight of a cleaning activator selected from the group consisting of formic acid, glacial acetic acid, trichloroacetic acid, adipic acid, benzoic acid, citric acid, malic acid, salicyclic acid, tannic aicd, tartaric acid, fumaric acid, gluconic acid, propionic acid, butyric acid, cinnamic acid, methylamine, monoethanolamine, cyclohexylamine, propylene diamine, ethylene diamine, and mixtures thereof; about 0.1 to 5.0 percent by weight of an oil-soluble surface-active agent; and about 99.5 to 70.0 percent by weight of a chlorinated organic solvent selected from the class consisting of methylene chloride, chloroform, monochlorobenzene, orthodichlorobenzene, and mixtures thereof;
   (B) maintaining said cleaning solution in contact with said utensil surface for a period of time and at a temperature from ambient to above sufficient to separate at least a portion of the food residue therefrom;
   (C) creating relative motion between said solution and said surface during at least a part of said period of contact; and
   (D) thereafter rinsing said surface with water to effect the removal of said solution and residue therefrom.

12. The method of claim 11 wherein water is added to said solution in a quantity sufficient to provide a two-phase mixture with a layer of water at least about one-half inch in depth on top of said solution, wherein said period of contact is about 1 to 15 minutes, and wherein said temperature ranges from about ambient to slightly below the boiling point of said solution.

13. The method of claim 11 wherein said activator is formic acid and said chlorinated organic solvent is methylene chloride, and wherein said utensil is a baking pan or the like with a resinous glaze providing said surface, which glaze remains substantially intact after said rinsing step.

References Cited
UNITED STATES PATENTS

| | | | |
|---|---|---|---|
| 2,423,343 | 7/1947 | Pluddemann | 134—40 X |
| 2,507,985 | 5/1950 | Kuentzel | 252—143 |
| 3,021,235 | 2/1962 | Schumacher | 134—40 X |
| 3,073,323 | 1/1963 | Rand | 134—1 X |
| 3,094,469 | 6/1963 | Strauss | 134—10 XR |
| 3,105,779 | 10/1963 | Bulat | 134—40 X |
| 3,189,552 | 6/1965 | Sims | 252—153 |
| 3,314,892 | 4/1967 | Graham | 252—153 |

JOSEPH SCOVRONEK, Primary Examiner

S. MARANTZ, Assistant Examiner

U.S. Cl. X.R.

134—2, 3, 39; 252—143, 153